Patented Jan. 22, 1924.

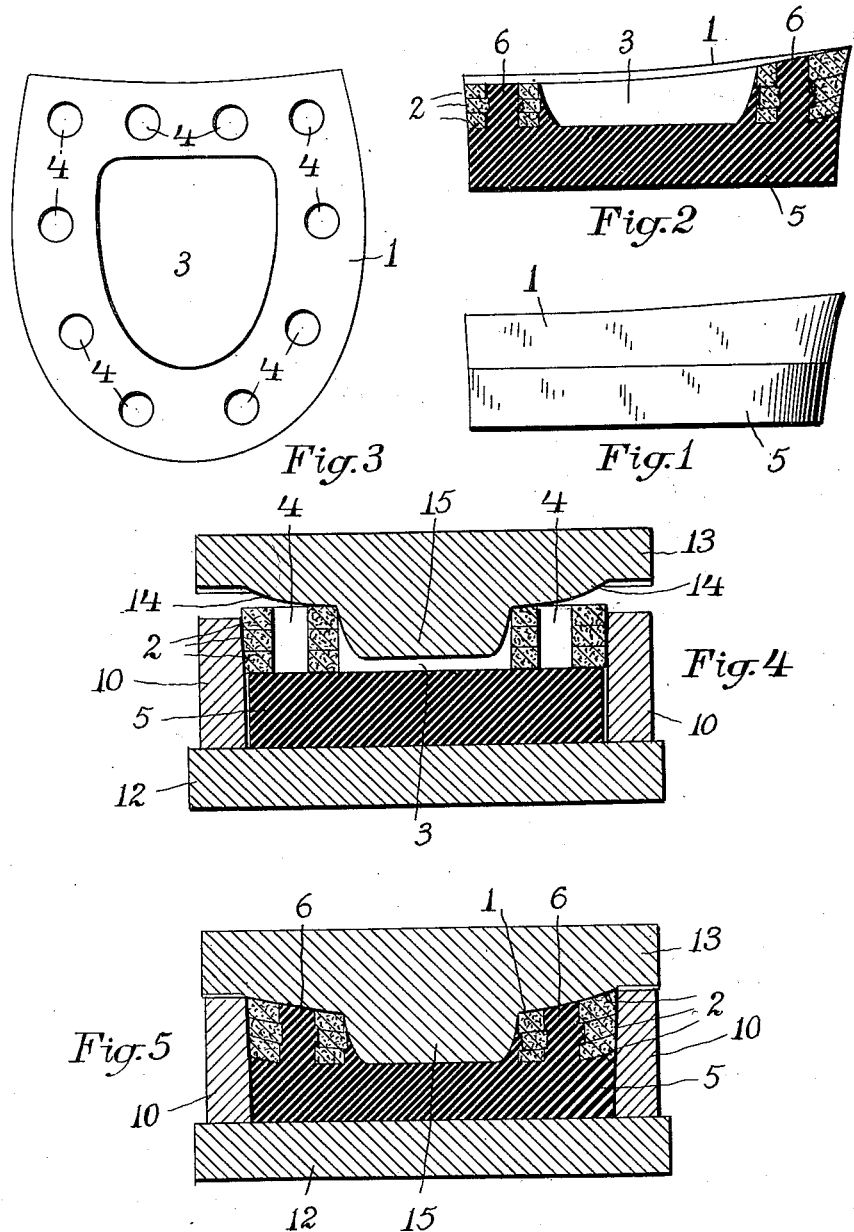

1,481,254

UNITED STATES PATENT OFFICE.

LEON B. CONANT, OF CAMBRIDGE, MASSACHUSETTS, ASSIGNOR TO GEORGE W. CONANT, OF BRIDGEWATER, MASSACHUSETTS.

METHOD FOR PRODUCING HEELS.

Application filed November 17, 1920, Serial No. 424,583. Renewed June 7, 1923.

*To all whom it may concern:*

Be it known that I, LEON B. CONANT, a citizen of the United States, and a resident of Cambridge, in the county of Middlesex and Commonwealth of Massachusetts, have invented a new and useful Method for Producing Heels, of which the following is a full, clear, and exact specification.

The object of this invention is the effecting of a process of molding heels and soles for boots and shoes so that they will have their treads capable of removal when badly worn, for the application of a fresh tread, such heel or sole being composed of a tread consisting of a rubber composition, and a base of a neutral composition.

In carrying the process into effect, I take a perforated base composed of a neutral material, as fibre-board, leather and the like, and introduce it into a mold with a body of compressible material, as unvulcanized or untreated rubber gum or rubber composition; and then by means of heat and pressure mold the two into intimate contact, the rubber composition entering the perforations of the base and securely binding the two parts together, but permitting them to be stripped apart upon the exertion of suitable force.

In the drawings forming part of this specification, Fig. 1 is a side view of a shoe heel made by my process. Fig. 2 is a sectional elevation of the same on the line 2—2 in Fig. 3. Fig. 3 is a plan view of the base of the heel. Fig. 4 is a sectional elevation of a mold and of a base and tread about to be treated. Fig. 5 is a sectional elevation of the same elements after the mold has closed.

The heel alone is illustrated since the process of molding the tread upon a sole is substantially the same. This heel consists of a base 1 composed preferably of a plurality of plies of fiber-board or leather-board 2, having preferably a central cavity 3 and a series of holes 4 near its periphery, as shown in Fig. 3, and a tread of rubber composition 5 from which rise projections 6 into the holes 4 of the base and by which the two parts are securely bound together.

As shown in Fig. 4, the base 1 is built up with preferably three layers of neutral material, preferably leather-board; and it is called neutral because rubber will not vulcanize strongly upon it. Three layers are used because it is commercially impractical to produce leather board in thicknesses much in excess of three or four sixteenths of an inch best adapted to the purpose, and to obtain the requisite thickness of the base the stated number of layers or plies preferably must be used.

The base 1 having been shaped as shown in Fig. 3, it is introduced between the walls 10 of a mold, with a block of untreated rubber or rubber composition beneath it and resting upon the floor 12 of the mold. The portion 13 of the mold is formed with a convex under surface 14 and preferably a central boss 15 corresponding in shape to the cavity 3 but preferably smaller at its lowermost portion both to enable it to enter the cavity freely, and for a purpose hereinafter described.

Heat being supplied to the mold and pressure being applied, the base and tread are powerfully forced into union with each other, the rubber from the tread passing into the holes 4 and completely filling them and the space between the boss 15 and the walls of the cavity 3. The rubber thus filling this space aids in binding the tread to the base, although the main reliance is upon the plugs 16 in the holes 4. For more strongly confining these plugs in the holes so that they will remain therein even when the treads are stripped away from the upper portions of bases 1, the holes 4 are made by my process more or less irregular or zigzag, as illustrated in Fig. 5. This irregularity is produced by having the plies 2 originally separate and simply superposed in the mold, so that when the cap or top 13 of the mold crushes down thereon, there will be a relative lateral slipping of the plies, as well as a canting of each hole due to the curvature imparted to the plies, which gives the irregularity desired.

Another important feature of my process is that the snug filling of the mold by the base 1 in its contact with the walls 10, serves to prevent the rubber from the forming tread 5 from rising between such surfaces and becoming wasted. In other words, the overflow of the rubber is reduced to a minimum.

What I claim is:

1. The herein described process of producing heels and the like, which consists in placing within a mold a plurality of substantially duplicate perforated layers composed of fibrous material, and a biscuit of rubber composition, and applying heat and pressure thereto, the pressure being applied in a way to concave said plies and thereby to put said perforations in adjacent layers partly out of alinement, whereby the rubber composition forced into said perforations is given a staggered form and made more strongly to retain their place therein.

2. The herein described process of producing heels which consists in introducing within a mold a biscuit of rubber composition together with a plurality of layers of fibrous material having perforations, the former becoming the tread and the latter the base of the heel, placing the upper plate of said mold in position and introducing the whole between pressure applying members of a suitable press, giving heat and pressure thereto, whereby the layers composing the base of the heel are cupped to conform with the mold, throwing out of alinement their perforations, staggering the teats of rubber composition pressed therein, and imparting like cupping to the upper face of said tread.

In testimony that I claim the foregoing invention, I have hereunto set my hand this 15th day of November, 1920.

LEON B. CONANT.